United States Patent
Lagassey

(10) Patent No.: US 11,113,728 B2
(45) Date of Patent: Sep. 7, 2021

(54) SYSTEM AND METHOD FOR MARKETING OVER AN ELECTRONIC NETWORK

(71) Applicant: Tamiras Per Pte. Ltd., LLC, Dover, DE (US)

(72) Inventor: Paul Lagassey, Vero Beach, FL (US)

(73) Assignee: Tamiras Per Pte. Ltd., LLC, Wilmington, DE (US)

( * ) Notice: Subject to any disclaimer, the term of this patent is extended or adjusted under 35 U.S.C. 154(b) by 0 days.

(21) Appl. No.: 14/157,715

(22) Filed: Jan. 17, 2014

(65) Prior Publication Data

US 2014/0136334 A1     May 15, 2014

Related U.S. Application Data

(63) Continuation of application No. 13/401,006, filed on Feb. 21, 2012, now Pat. No. 8,660,838, which is a
(Continued)

(51) Int. Cl.
    *G06Q 30/00*     (2012.01)
    *G06Q 30/02*     (2012.01)

(52) U.S. Cl.
    CPC ......... *G06Q 30/0269* (2013.01); *G06Q 30/02* (2013.01); *G06Q 30/0241* (2013.01); *G06Q 30/0273* (2013.01); *G06Q 30/0277* (2013.01)

(58) Field of Classification Search
    CPC ............... G06Q 30/02; G06Q 30/0255; G06Q 30/0235; G06Q 10/105; G06Q 10/103;
(Continued)

(56) References Cited

U.S. PATENT DOCUMENTS

| 5,614,927 A | 3/1997 | Gifford et al. |
| 5,615,341 A | 3/1997 | Agrawal et al. |

(Continued)

OTHER PUBLICATIONS

Nelson et al., Advertainment or Adcreep Game Players' Attitudes Toward Advertising And Product Placements In Computer Games. Journal of Interactive Advertising, vol. 5 No. 1 (Fall 2004), pp. 3-21. (Year: 2004).*

(Continued)

*Primary Examiner* — Patricia H Munson
*Assistant Examiner* — Uche Byrd
(74) *Attorney, Agent, or Firm* — Fitch, Even, Tabin & Flannery LLP

(57) ABSTRACT

A method, and system for implementing the method, comprising the steps of providing an object browser user supporting at least speech communication with the user, permitting user-controlled browsing of objects received through a computer communication network; downloading an object through the computer communication network in dependence on a user input, the object having an associated data file defining a predetermined vocabulary and a predetermined grammar; presenting the downloaded object through the object browser, wherein speech information received from the user is interpreted in conjunction with both the predetermined vocabulary and the predetermined grammar; and selectively generating at least one communication through the computer communication network, in dependence on the interpreted speech information.

19 Claims, 3 Drawing Sheets

USER INTERFACE

Related U.S. Application Data continuation of application No. 11/970,372, filed on Jan. 7, 2008, now Pat. No. 8,121,896.

(60) Provisional application No. 60/883,752, filed on Jan. 5, 2007.

(58) Field of Classification Search
CPC ........... G06Q 10/067; G06Q 10/06315; G06Q 40/00; G06Q 30/00; G06Q 30/06; G06Q 30/0269; G06Q 30/0241; G06Q 30/0273; G06Q 30/0277; H04Q 7/20
See application file for complete search history.

(56) References Cited

U.S. PATENT DOCUMENTS

| | | |
|---|---|---|
| 5,664,948 A | 9/1997 | Dimitriadis et al. |
| 5,724,521 A | 3/1998 | Dedrick |
| 5,724,573 A | 3/1998 | Agrawal et al. |
| 5,754,939 A | 5/1998 | Herz et al. |
| 5,796,209 A | 8/1998 | Khan et al. |
| 5,812,997 A | 9/1998 | Morimoto et al. |
| 5,835,087 A | 11/1998 | Herz et al. |
| 5,848,396 A | 12/1998 | Gerace |
| 6,026,368 A | 2/2000 | Brown et al. |
| 6,026,369 A | 2/2000 | Capek |
| 6,055,573 A | 4/2000 | Gardenswartz et al. |
| 6,161,142 A | 12/2000 | Wolfe et al. |
| 6,183,366 B1 | 2/2001 | Goldberg et al. |
| 6,216,112 B1 | 4/2001 | Fuller et al. |
| 6,477,575 B1 | 11/2002 | Koeppel et al. |
| 6,484,148 B1 | 11/2002 | Boyd |
| 6,487,538 B1 | 11/2002 | Gupta et al. |
| 6,510,417 B1 | 1/2003 | Woods et al. |
| 6,526,335 B1 | 2/2003 | Treyz et al. |
| 6,604,138 B1 | 8/2003 | Virine et al. |
| 6,611,842 B1 | 8/2003 | Brown |
| 6,625,464 B1 * | 9/2003 | Bandy et al. .................. 455/503 |
| 6,628,314 B1 | 9/2003 | Hoyle |
| 6,629,034 B1 | 9/2003 | Kozak et al. |
| 6,712,702 B2 | 3/2004 | Goldberg et al. |
| 6,718,551 B1 | 4/2004 | Swix et al. |
| 6,771,290 B1 | 8/2004 | Hoyle |
| 6,804,659 B1 | 10/2004 | Graham et al. |
| 6,836,799 B1 | 12/2004 | Philyaw et al. |
| 6,868,525 B1 | 3/2005 | Szabo |
| 6,925,440 B1 | 8/2005 | Shkedi |
| 6,950,804 B2 | 9/2005 | Strietzel |
| 7,075,899 B2 | 7/2006 | Sheehan et al. |
| 7,092,926 B2 | 8/2006 | Cerrato |
| 7,103,643 B1 | 9/2006 | Jacobs et al. |
| 7,124,090 B1 | 10/2006 | Howard et al. |
| 8,121,896 B1 | 2/2012 | Lagassey |
| 2003/0023435 A1 | 1/2003 | Josephson |
| 2003/0023437 A1 * | 1/2003 | Fung .................. G10L 15/1815 704/236 |
| 2005/0132420 A1 * | 6/2005 | Howard .................. G06F 3/017 725/135 |
| 2006/0036493 A1 * | 2/2006 | Aufricht ............ G06Q 30/0273 705/14.58 |
| 2011/0029876 A1 * | 2/2011 | Slotznick .................. G09B 5/06 715/727 |

OTHER PUBLICATIONS

Agrawal et al., "Mining Association Rules Between Sets of Items in Large Databases", Proc. of the ACM SigMod Conf. on Management of Data, May 1993, pp. 207-216.

* cited by examiner

USER INTERFACE

FIGURE 2
EXAMPLE OF LAUNCH COMMANDS FILE

```
CoolInfoLaunchCommands.lst
[Commands]
zzzz1=sleep,5
zzzz1=speak,Welcome to CoolInfo. CoolInfo is brought to you by Cool Soft L L C dot
com. Software that's fun, easy to use and affordable.
zzzz1=coolbrowse,http://www.coolsoftllc.com/coolinfo/index.asp
zzzz1=browse,http://www.coolsoftllc.com
zzzz1=sleep,10
zzzz1=focus
zzzz1=read
```

FIGURE 3
EXAMPLE OF PROGRAMS COMMANDS FILE

CoolInfoCoolSoftCommands.lst
[General]CommandIDsBase = 20200
DefaultBanner=http://www.coolsoftllc.com/banners/sttbanner.asp?id=14
[CommandsGroupName]name="PC Advisor"
[Commands]
Hello Computer=speak,Hello¼Say "Hello Computer" to make your computer say hello.
Good Morning Computer=speak,Good Morning. Have a great day!¼Say "Good Morning Computer" to make your computer say good morning.
Good Night Computer=speak,Good night and happy dreams!¼Say "Good Night Computer" to make your computer say good night.
Say hi to my friends=speak,Hi my friends.¼Say "Say hi to my friends" to make your computer say hi to your friends.
Fox News=banner,http://www.coolsoftllc.com/coolinfo/CoolInfoBanners/index.asp¼Say "Fox News" to open the Fox News Webpage
Fox News=browse,http://www.foxnews.com
Fox News=sleep,60
Fox News=focus
New York Times=banner,http://www.coolsoftllc.com/coolinfo/CoolInfoBanners/index.asp¼Say "New York Times" to open the New York Times Webpage
New York Times=browse,http://www.nytimes.com
New York Times=sleep,60
New York Times=focus
Wall Street Journal=banner,http://www.coolsoftllc.com/coolinfo/CoolInfoBanners/index.asp¼Say "Wall Street Journal" to open the Wall Street Journal Webpage
Wall Street Journal=browse,http://online.wsj.com/public/us
Wall Street Journal=sleep,60
Wall Street Journal=focus
cnn=browse,www.cnn.com¼Say "CNN" to open the CNN Webpage
cnn=banner,http://www.coolsoftllc.com/coolinfo/CoolInfoBanners/index.asp
cnn=sleep,60
cnn=focus

SYSTEM AND METHOD FOR MARKETING OVER AN ELECTRONIC NETWORK

CROSS-REFERENCE TO RELATED APPLICATIONS

This application is a continuation of U.S. application Ser. No. 13/401,006, filed Feb. 21, 2012, now U.S. Pat. No. 8,660,838, issued Feb. 25, 2014, which is a continuation of U.S. application Ser. No. 11/970,372, filed Jan. 7, 2008, which is now U.S. Pat. No. 8,121,896, issued on Feb. 21, 2012, and which claims priority to U.S. Patent Application No. 60/883,752, filed Jan. 5, 2007, all of which are incorporated by reference herein in their entirety.

FIELD OF THE INVENTION

The present invention relates to the field of marketing systems and methods, and more particularly to a system and method for presentation of interactive advertisements.

BACKGROUND OF THE INVENTION

Targeted advertising is known, and advanced systems have been proposed in a number of patents and papers. See, U.S. Pat. Nos. 5,614,927, 6,484,148, 6,771,290, 6,628,314, 6,718,551, 6,925,440, 6,487,538, 7,124,090, 6,161,142, 7,075,899, 6,950,804, 6,026,368, 6,611,842, 6629034, 6,712,702, 6,183,366, 6,026,369, 6,836,799, 5,835,087, 5,754,939, 7,092,926, 6,055,573, 5848396, 6,804,659, 6,510,417, 6,604,138, 6,477,575, 6,868,525, each of which is expressly incorporated herein by reference.

Commercial Subsidy (Advertising)

Advertisers are generally willing to pay more to deliver an impression (e.g., a banner ad or other type of advertisement) to users who are especially sensitive to advertisements for their products or are seeking to purchase products corresponding to those sold by the advertisers, and the economic model often provides greater compensation in the event of a "click through", which is a positive action taken by the user to interact with the ad to receive further information. This principle, of course, actually operates correspondingly in traditional media. For example, a bicycle manufacturer in generally is willing to pay more per subscriber to place advertisements in a magazine having content directed to bicycle buffs than in a general interest publication.

Most search engines offer free access, subject to user tolerating background advertising or pitches for electronic commerce sales or paid links to sites that offer goods and services, including the aforementioned banner ads. These advertisements are typically paid for by sponsors on a per impression basis (each time a user opens the page on which the banner ad appears) or on a "click-through basis" (normally a higher charge, because user has decided to select the ad and "open it up" by activating an underlying hyper-link). In addition, most search engines seek "partners" with whom they mutually share hyperlinks to each other's sites. Finally, the search engines may seek to offer shopping services or merchandise opportunities, and the engines may offer these either globally to all users, or on a context sensitive basis responsive to a user's particular search.

Targeted Advertising

The current wide-ranging use of computer systems provides a relatively large potential market to providers of electronic content or information. These providers may include, for example, advertisers and other information publishers such as newspaper and magazine publishers. A cost, however, is involved with providing electronic information to individual consumers. For example, hardware and maintenance costs are involved in establishing and maintaining information servers and networks. One source that can be secured to provide the monetary resources necessary to establish and maintain such an electronic information distribution network includes commercial advertisers. These advertisers provide electronic information to end users of the system by way of electronically delivered advertisements, in an attempt to sell products and services to the end users. The value of a group of end users, however, may be different for each of the respective advertisers, based on the product or services each advertiser is trying to sell and the class or classification of the user. Thus, it would be beneficial to provide a system, which allows individual advertisers to pay all, or part of the cost of such a network, based on the value each advertiser places on the end users the advertiser is given access to. In addition, advertisers often desire to target particular audiences for their advertisements. These targeted audiences are the audiences that an advertiser believes is most likely to be influenced by the advertisement or otherwise provide revenues or profits. By selectively targeting particular audiences the advertiser is able to expend his or her advertising resources in an efficient manner. Thus, it would be beneficial to provide a system that allows electronic advertisers to target specific audiences, and thus not require advertisers to provide a single advertisement to the entire population, the majority of which may have no interest whatsoever in the product or service being advertised or susceptibility to the advertisement.

U.S. Pat. No. 5,724,521, expressly incorporated herein by reference, provides a method and apparatus for providing electronic advertisements to end users in a consumer best-fit pricing manner, which includes an index database, a user profile database, and a consumer scale matching process. The index database provides storage space for the tides of electronic advertisements. The user profile database provides storage for a set of characteristics that corresponds to individual end users of the apparatus. The consumer scale matching process is coupled to the content database and the user profile database and compares the characteristics of the individual end users with a consumer scale associated with the electronic advertisement. The apparatus then charges a fee to the advertiser, based on the comparison by the matching process. In one embodiment, a consumer scale is generated for each of multiple electronic advertisements. These advertisements are then transferred to multiple yellow page servers, and the titles associated with the advertisements are subsequently transferred to multiple metering servers. At the metering servers, a determination is made as to where the characteristics of the end users served by each of the metering servers fall on the consumer scale. The higher the characteristics of the end users served by a particular metering server fall, the higher the fee charged to the advertiser.

Each client system is provided with an interface, such as a graphic user interface (GUI), that allows the end user to participate in the system. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables, or user profile data, refer to information such as marital status, color preferences, favorite sizes and shapes, preferred learning modes, employer, job tide, mailing address, phone number, personal and business areas of interest, the willingness to participate in a survey, along with various lifestyle information. The end user initially enters the requested data and the non-identifying information is transferred to the metering server. That is, the information associated with the end user is compiled and transferred to the metering server without any indication of the identity of the user (for example, the name and phone number are not included in the computation). The GUI also allows the user to receive inquiries, request information and consume information by viewing, storing, printing, etc. The client system may also be provided with tools to create content, advertisements, etc. in the same manner as a publisher/advertiser.

Use of Transactional Data for Marketing

In recent years, the field of data mining, or extracting useful information from bodies of accumulated raw data, has provided a fertile new frontier for database and software technologies. While numerous types of data may make use of data mining technology, a few particularly illuminating examples have been those of mining information, useful to retail merchants, from databases of customer sales transactions, and mining information from databases of commercial passenger airline travel. Customer purchasing patterns over time can provide invaluable marketing information for a wide variety of applications. For example, retailers can create more effective store displays, and can more effectively control inventory, than otherwise would be possible, if they know that, given a consumer's purchase of a first set of items, the same consumer can be expected, with some degree of probability, to purchase a particular second set of items along with the first set. In other words, it would be helpful from a marketing standpoint to know association rules between item-sets (different products) in a transaction (a customer shopping transaction). To illustrate, it would be helpful for a retailer of automotive parts and supplies to be aware of an association rule expressing the fact that 90% of the consumers who purchase automobile batteries and battery cables also purchase battery post brushes and battery post cleanser. (In the terminology of the data mining field, the latter are referred to as the "consequent.") It will be appreciated that advertisers, too, can benefit from a thorough knowledge of such consumer purchasing tendencies. Still further, catalogue companies can conduct more effective mass mailings if they know the tendencies of consumers to purchase particular sets of items with other sets of items.

It is possible to build large databases of consumer transactions. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. As alluded to above, however, building a transaction database is only part of the marketing challenge. Another important part is the mining of the database for useful information. Such database mining becomes increasingly problematic as the size of databases expands into the gigabyte, and indeed the terabyte, range. Much work, in the data mining field, has gone to the task of finding patterns of measurable levels of consistency or predictability, in the accumulated data. For instance, where the data documents retail customer purchase transactions, purchasing tendencies, and, hence, particular regimes of data mining can be classified many ways. One type of purchasing tendency has been called an "association rule." In a conventional data mining system, working on a database of supermarket customer purchase records, there might be an association rule that, to a given percent certainty, a customer buying a first product (say, Brie cheese) will also buy a second product (say, Chardonnay wine). It thus may generally be stated that a conventional association rule states a condition precedent (purchase of the first product) and a condition subsequent or "consequent" (purchase of the second product), and declares that, with, say 80% certainty, if the condition precedent is satisfied, the consequent will be satisfied, also. Methods for mining transaction databases to discover association rules have been disclosed in Agrawal et al., "Mining Association Rules Between Sets of Items in Large Databases", Proc. of the ACM SigMod Conf. on Management of Data, May 1993, pp. 207-216, and in Houtsma et al., "Set-Oriented Mining of Association Rules", IBM Research Report RJ 9567, October, 1993. See also, Agrawal et al., U.S. Pat. Nos. 5,615,341, 5,796,209, 5,724,573 and 5,812,997. However, association rules have been limited in scope, in the sense that the conditions precedent and subsequent fall within the same column or field of the database. In the above example, for instance, cheese and wine both fall within the category of supermarket items purchased.

SUMMARY OF THE INVENTION

One embodiment of the present invention provides a software program which is, for example, "adware" subsidized. See, U.S. Pat. Nos. 7,103,643, and 6,216,112, expressly incorporated herein by reference. The software program, for example, comprises at least one of a speech to text engine and a text to speech engine, and preferably has features that make it desirable for users to run the program regularly or leave the application running continuously. The program delivers advertising messages to users in at least one of graphic images (banners), printed text, and spoken messages delivered by a text to speech engine. Graphic images and printed text can contain links to the subject of the marketing messages and spoken messages invite the user to click on the links and otherwise promote the subject of the marketing messages. Speech output may be associated with "hyperlinks", in which a spoken or physical response to the speech provokes a response which is based on an encoding in the source presentation. Some features and advertising content are determined through at least one configuration file that is external to the software program and read by the program at least one of locally and over the Internet. Sponsors of marketing messages may, for example, pay for delivery of content based at least one of impressions (number of views), click-throughs (visits to the sponsors website), and conversions (sales).

The speech functions of the application, or which are available to the application, are employed to "speech enable" the advertisement. While the term advertisement generally means a commercial message delivered spontaneously to the user without solicitation, to provide sponsorship revenue to the presenter of the message, in accordance with the present invention, the traditional advertisement may be substituted with an arbitrary message for arbitrary purposes. For example, in a corporate environment, corporate communications may be presented in place of a traditional advertisement. By speech enabling the communication, it may generate spoken words to the user, and/or receive spoken input from the user. Preferably, the speech is not communicated beyond the client machine as sound files, and at least one of a speech to text or text to speech engine performs text-to-speech and/or speech-to-text conversions. These may be separate applications, or consolidated. While the invention need not encompass both modalities, a full bidirectional text and speech interface is also contemplated.

While, according to a preferred embodiment, the speech recognition engine and text to speech engine are a core function of the software program, this need not be the case. The program may include either or both of these functionalities, and the speech functionality may be provided by another application or through operating system functionality.

Typically, the program executes within a graphic user interface operating system, so that the speech functionality is not normally the principal user interface for the computer, however, this is not a limitation of the present invention, which may be used in platforms which have speech-centric user interfaces.

If the advertisement is associated with a speech input function, it is preferably received in association with a vocabulary and/or set of grammars which define permissible interactions of the user with the advertisement. In this way, the associated data facilitates distinguishing between commands and data intended for interaction with the advertisement, commands, data intended for the program or other contexts, and stray noise. Likewise, by constraining the vocabulary and/or grammar of the interaction, accuracy is increased and computational complexity decreased, thus permitting the system to function without substantial disruption to the user.

BRIEF DESCRIPTION OF THE DRAWINGS

The invention will now be described by reference to the drawings, in which:

FIG. 2 shows an example of the launch commands file according to a preferred embodiment of the present invention; and FIG. 3 shows an example of the programs commands file according to a preferred embodiment of the present invention.

DETAILED DESCRIPTION OF THE PREFERRED EMBODIMENT

Figure 1:
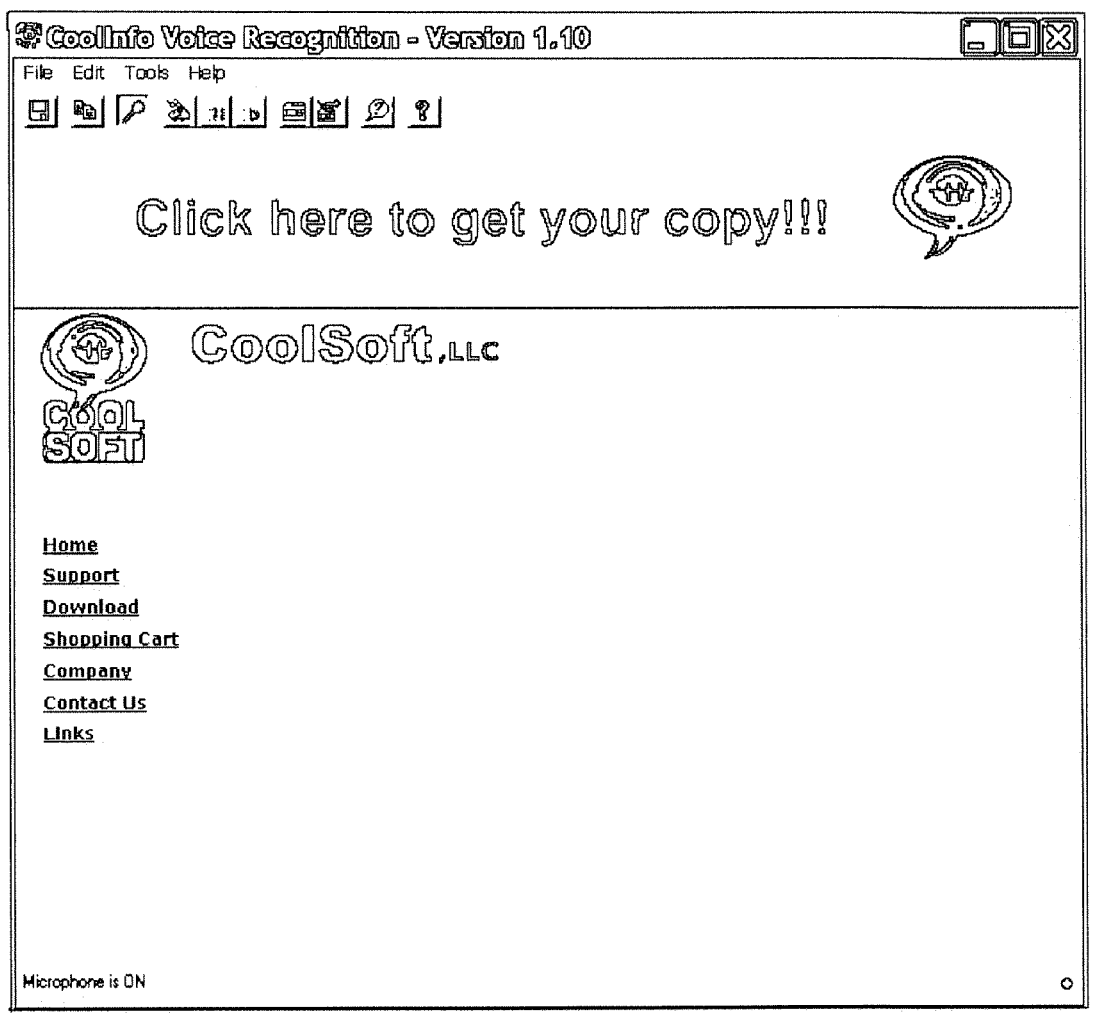
FIG. 1 shows a program user interface according to according to a preferred embodiment of the present invention.

A preferred embodiment of the invention employs the "CoolInfo"™ program (CoolSoft, LLC, Vero Beach, Fla.), which is a voice recognition program that includes a speech to text engine and a text to speech engine. In order to subsidize use of this software, rendering it low cost or no cost, a feature is provided which presents advertising information to users. Advantageously, the advertisements employ speech enabled features of the program, though the technique is compatible with other types of software which do not themselves integrate speech engines, by employing an external speech engine or operating system or server functionality.

For example, the program may be distributed for free or at a nominal cost, and users are required to register the program to achieve full functionality. Optionally, a registration process requires the user to provide at least a valid email address for sending a registration key, and if desired the registration process can require the user to provide at least some basic demographic information. The distributor can use this information to build an opt-in mailing list which has value to potential advertisers. Alternately, the message delivery system avoids use of email, and instead presents messages and if registration is required, effectuates registration directly through the program or an associated component.

Optionally, a trial period can be offered to give the user time to try the program and complete the registration process. For example, the software may provide a thirty day fully functional trial period before the user must register. After thirty days, the program cannot be started unless it is validly registered. During the trial period, a trial startup dialog can be displayed to encourage the user to register the program and provide a link and dialog for registration. If desired, the trial startup dialog can display a banner ad in its window, along with a second banner ad when the program is launched in trial mode.

The registration process enables the distributor to collect basic information from users without having to send any personal information from the user's computer. In fact, it is desirable not to take any personal information from the user's computer in order to avoid it being labeled as spyware.

The system may also acquire information from the user, data stored on the computer, or through activities of the user. Instead of directly communicating this data externally, it may use this information to formulate queries of external databases, in a form which leaks only a small amount of information, with the response to the query then presented, or filtered and a portion presented to the user. The revenues may be generated by splitting a fee with the query engine host. Preferably, the fee is dependent, at least in part, on a user interaction with the advertisement and/or a commercial transaction resulting from the presentation. In such an incentive environment, the value of the user profile and its use to predict user interactions and/or transactions is exploited, while the compensation considered reasonable by an advertiser is significantly higher than compensation for mere presentation of ads.

The profiling elements are well known to those of ordinary skill in the art, and continually evolve, and need not be disclosed herein in detail. The profiles may be extracted from other local software datafile, or from a remote server.

In order to avoid excessive leakage of personal information from the system, a number of options are available. One is the generation of a high proportion of spurious communications, to obscure genuine communications, and thereby prevent useful analysis of the communication stream. Likewise, the information produced by the system may be highly granular, instead of composite, wherein the local software aggregates and filters the results, potentially from different sources, i.e., different search engines, or through different proxies to the same search engine.

The user interface shown in FIG. 1 has a menu, buttons for major functions, a banner window and a browser window. The object of this method is to provide a software program that delivers advertising content, in addition to the intrinsic functions of the software. The software is designed to incorporate features that users will find desirable to use on a regular basis, thus causing them to keep the program running regularly, allowing it to also deliver its advertising content. The longer the software remains running and active, the more advertising content can be delivered to the user.

The preferred program includes both a speech-to-text engine and a text-to-speech engine. With it, users can use speech commands to browse to selected websites and use certain search engines as specified in a configuration file, discussed in more detail below. The program may integrate or subsume a browser, so that Web pages can open in either or both of the program's own browser window or the default browser on the computer.

The preferred program has one or more configuration file that contains available or valid commands, which are read by the program when it starts, although it is also possible to refresh the configuration file at regular intervals, or obtain the valid commands from other sources than a configuration file. For example, the program may employ optical character recognition to read possible commands from a screen buffer, or read data files or operating system API streams. Using a configuration file that is external to the software program enables program content and advertising content to be modified regularly and easily without necessitating changes to the program. The configuration file is discussed in detail below.

Browsing and searching the Internet by speech is a feature of the preferred CoolInfo™ program that users will find valuable, and provides a medium for delivering advertising content. Web pages to be opened can be public third-party web pages, or web pages hosted by the distributor or sponsor that contain the desired content. If web pages are opened in the program's browser window, they can contain advertising medium in the form of banners, text or links. In the preferred program, the data for a command in the configuration file can also include text of a message to be read by the text to speech engine when the command is invoked so as to provide the user with a spoken message. This spoken message can be provided with each browse or search command whether the web pages are opened in the program's or the default browser. If a web page is opened in the program's browser, the configuration file can contain a command that uses the text to speech engine to read the contents of the program's browser window which may contain an advertising message which is read along with other information which is presumably of interest to the user. When reading the sponsor message directly from the page content (or using optical character recognition to extract the message from graphic content), it is then not necessary to include a separate text message to be read. Likewise, by extracting data from a normal advertisement (versus one specially encoded for this purpose), the system need not closely cooperate with the advertising server.

The software program is able to accept different types of variables in speech command inputs. For example, in the CoolInfo™ embodiment, the program is capable of two types of variables. A text variable is used with search engine search commands and a numeric variable is used, for example, to search the weather by zip code. The command syntax is:

Command+Search Variable

When the command is spoken, the program takes the words spoken following the command and adds them to the appropriate position in the URL.

For example, the command "Search Google Speech Recognition" returns the following URL to the computers default web browser: http://www.google.com/search?hl=en&q=speech+recognition The command "Weather Zip Code 3 2 9 6 3" returns the following URL to the CoolInfo™ browser window: http://coolsoftllc.com/coolinfo/weather/results.asp?zip=32963

The above link is to an .asp page which strips the desired information from the following link for presentation and reading in the CoolInfo™ browser window. http://www.srh.noaa.gov/forecast/MapClick.php?CityName=Vero+Beach&state=FL&site=MLB The text of the page presented in the program's browser window can include a sponsor message. The text to speech engine is used to read the sponsor message and page content, the latter of which is presumably of interest to the user. Various methods for striping and reformatting information on a web page for presentation in a different format are well known in the art and need not be discussed further here.

The software program contains at least one of a banner window and a browser window. The preferred program has both a banner window and a browser window. The graphic in the banner windows is specified in the at least one configuration file at startup and with each command. For example, the software has one banner window, and is designed to refresh the banner every two minutes to allow for rotation of banners if desired. The refresh interval can also be specified in the configuration file, or derived externally. For example, the banner itself may encode its duration.

Each speech command in the preferred program can be programmed to display its own banner if desired, and this is specified in the same configuration file that contains the speech commands. The hosting website tracks impressions and clicks on the banners using methods that are well known in the art. Page views of web pages hosted by the distributor can also be tracked. The software may be designed to, or not to, track views and clicks to third party websites initiated from a link other than from a banner in the banner window or a web page hosted in an internal browser window. In the former case, the program risks being labeled as spyware. Thus, the software can be designed to report clicks from any links in any browser window. Likewise, if it is desirable to track conversion, known methods in the art for tracking conversions can be used.

One of the objects of this invention is to have features and functionality in the software program that makes it desirable for users to keep the program running regularly, so as to maximize exposure for advertising sponsors. For example, the Windows calculator to be operated by speech, and/or a User Commands feature that lets users create their own speech commands to open documents and files, run programs, browse webpages, make the computer speak and other command functions which can be run on the user's computer.

In order to enable User Commands functionality, a User Commands configuration file is maintained which contains all the information required by the program to build grammars for, and process speech commands created by, the user. The information in this User Commands configuration file is similar to information in the program configuration file discussed below. Optionally, a User Command can include command parameters for the operating system and/or programs. The preferred program uses a vertical slash "|" to separate the command and the parameter. In this preferred program, the user can create a User Command to run a home automation program, and pass information to this program, for example a command to turn on a specific light module or run a macro. The home automation program may communicate with automated devices, for example, through wired networks, so-called wireline networks (powerline), wireless networks (Wireless Ethernet 802.11x, Bluetooth, ZigBee, WiMax, Wireless USB, UWB, or the like), USB, Firewire (IEEE-1394), optical/infrared (e.g., IRdA), ultrasonic, or other communication platform. Advantageously, speech communicated through remote devices and/or telephony equipment for interaction with the program.

In an alternate embodiment, program commands and User Commands can function without speech. The commands are activated from at least one of links in a list and buttons displayed with the user interface or in the program's browser window.

In order to speech enable the calculator, a program command file (calc.1st) is installed locally on the computer. This file contains the calculator speech commands and is used to build grammars for these speech commands which are then used by the program and the speech engine whenever the user speaks the "start calculator" program command. Optionally, a web page with instructions for using the Windows calculator with speech is loaded in the program's browser window as one of the command steps used to start the calculator. When the calculator command is invoked, the program then directs the user's speech input to the calculator program. Alternately, the calculator may be presented directly in a web page using a local server, or as a Java applet. Similarly, an instruction page can be loaded with other features if desired, and also if desired can be read by the text to speech engine.

Another possible program function is a look up contacts feature. When this feature is invoked, the program reads the default address book on the computer and builds command grammars for each contact. Optionally, when the lookup feature is invoked, the program can display a list of contacts in its browser window based on the command grammars. When the user speaks a command including the name of a contact, the program displays specified fields for the contact in the programs browser window. As with other information displayed in the programs browser window, a command can be issued for the text to speech engine to read the contact's information as displayed. The information may also automatically populate fields in a web page or program interface screen.

An optional "What Can I Say?" dialog may be made available. This dialog displays a list of speech commands available to the user. Optionally, each command displayed in the "What Can I Say?" dialog has a tool tip with more information. The user moves the pointer over the command to display the tool tip. When included in the preferred program, the "What Can I Say?" feature is intended to make it easier for users to run the program, thereby increasing the probability of more frequent and regular use. Other types of "help" or user assistance may also be provided, such as "wizards", tutorials, frequently asked questions (FAQ), etc. Each of these user assistance features, in turn, may be speech enabled for input and/or output. Likewise, each interaction with the user affords the possibility of presenting an advertisement, and/or determining a user context to ensure delivery of relevant subsidy content. The availability of subsidy, in turn, incentivizes high quality user assistance which is viewed by the user as a valuable resource. Indeed, the speech enabled user assistance for performing various tasks or providing computer-based instruction may be a principal function of the software, wherein the tasks to be assisted with are extrinsic to the program.

As previously discussed, using a configuration file that is external to the program allows the advertising content and some of the features of the software program to be controlled externally, which enables the distributor to modify them regularly to add commands and features, and manage advertising content for the software program.

In the preferred embodiment, two configuration files are utilized and are hosted by the distributor. The first configuration file is the "launch commands" file, which contains commands to execute upon startup. The second configuration file is the program commands configuration file, which contains the speech commands for browsing and searching and the advertising content (banner and spoken message) that will be displayed with each command. The preferred program uses the information in this commands configuration file to build grammars for speech commands that will be available to the user. Both configuration files are read when the program starts, although in alternate embodiments they could be read regularly at specified intervals. The launch commands file is read and not downloaded, and the program commands file is read and saved locally. If the program starts when it is not connected to the Internet, the launch commands will not run, but the program commands configuration file that was last downloaded will be read, and when the computer connects to the Internet it will be possible to run these commands without starting the program. However, in alternate embodiments, it might be desirable to download both configuration files locally, or not to download either and require the user's computer to be connected to the Internet before using the program. It is also possible and may be desirable to use only a single configuration file, or to use multiple configuration files for various types of commands and features.

The software program can use a default path for its command configuration files, and can employ a method for identifying sponsors and specifying the path for the commands configuration file(s) to be used by a particular sponsor. The preferred embodiment employs both a default path, and if a sponsor ID file is present uses that information to determine the path for the launch and program configuration files. This enables the distributor to license copies of the software program for distribution directly by advertising sponsors, and to customize the content to be delivered by the program by copies distributed by each of such sponsors. Thus, additional revenues can be derived from licensing copies of the program which deliver customized content.

The at least one program commands configuration file contains a list of speech commands, the URL link for each command, whether the URL link is opened in the software program or the default browser, and the at least one banner to be displayed. The program commands configuration file can also specify other commands parameters, such as read, sleep, focus.

The following are the command syntax and commands that are preferably available. Typically, commands have multiple steps. The syntax for each line in a command group is:

Speech Command=Command Step

The speech command (the text to the left of the equal "=" sign) is generally identical for each step in a command, and the text portion may be case sensitive.

The following is a list of available command steps in a preferred embodiment. This list is not intended to be limiting, and other embodiments can have additional or different command steps.

Browse,URL: Opens the URL in the computers default web browser.
    CoolBrowse,URL: Opens the URL in the CoolInfo window.
    Banner,URL: Opens the URL for the banner in the CoolInfo banner window.
    Read: Uses the text to speech engine to reads the contents of CoolInfo
    Sleep,Seconds: Pauses the specified number of seconds before proceeding to the next command step.

Focus: Brings CoolInfo to the foreground with the active focus.

Speak,Phrase: Uses the text to speech engine to read the phrase.

Tool Tip: If a "What Can I Say?" dialog and corresponding tool tips are employed as a feature, a separator is used in any step in the command group followed by text for a tool tip.

The following is an example of a speech command with multiple steps. This command opens the specified banner link in the banner window, opens the www.nytimes.com webpage in the default browser, sleeps for 60 seconds to give the user time to view the target web page in the default browser, and then brings the program to active focus so the user can see the banner. Optionally, a Speak command could be included at the end of this command group (after the focus command) to read a message inviting the user to click on the banner, New York Times=banner, http://www.coolsofffic.com/coolinfo/CoolInfoBanners/index.asp¼Say "New York Times" to open the New York Times Webpage New York Times=browse, http://www.nytimes.com New York Times=sleep,60 New York Times=focus In the preferred embodiment, the location of the URL where the commands configuration files are kept is secure, to protect it from tampering, and the software program runs only commands, as indicated above, that deliver content and manage the software program. These security measures prevent the software program from being used for delivering malicious content to users in the event the security of the commands configuration file(s) is compromised and the content is tampered with by a malicious third party.

A sample a launch commands configuration file and a program commands configuration file as used with the preferred embodiment are included below in FIGS. 2 and 3.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods, and methods of using the apparatus, and computer software for implementing the various automated control methods on a general purpose or specialized computer system, of any type as well known to a person or ordinary skill, and which need not be described in detail herein for enabling a person of ordinary skill to practice the invention, since such a person is well versed in industrial and control computers, their programming, and integration into an operating system. For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and/or steps described with respect to one embodiment may be used with other embodiments and that not all embodiments of the invention have all of the features and/or steps shown in a particular figure or described with respect to one of the embodiments. That is, the disclosure should be considered combinatorially complete, with each embodiment of each element considered disclosed in conjunction with each other embodiment of each element (and indeed in various combinations of compatible implementations of variations in the same element).

Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims. It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

What is claimed is:

1. A method comprising:

displaying at least one program display of a computer program configured to request and receive information and an interactive advertisement on a user interface of a user device, the user device configured to request and receive information from a distributor computing device, the user interface comprising a banner window and a browser window;

transmitting a signal from the user device to access at least one commands configuration file that comprises:

speech-to-text commands related to the interactive advertisement, at least one commands parameter for the speech-to-text commands, and at least one of a URL link to be accessed via the browser window for each speech-to-text command and at least one graphic to be displayed via the banner window for each speech-to-text command, wherein the at least one commands configuration file is hosted by the distributor computing device remotely located from the user device;

presenting a message associated with the interactive advertisement via the user interface to facilitate user interaction with the displayed interactive advertisement, the message received at the user device from the distributor computing device;

receiving a speech-to-text command;

recognizing the received speech-to-text command as corresponding to at least one of the speech-to-text commands of the commands configuration file related to the interactive advertisement;

responsive to the recognized speech-to-text command, updating the banner window of the user interface with the at least one graphic for the speech-to text command in the at least one commands configuration file and updating the browser window with the URL link for the speech-to-text command in the at least one commands configuration file; and identifying an advertising sponsor of the displayed interactive advertisement by specifying a path for the at least one commands configuration file used by the distributor computing device to facilitate collection of revenue to subsidize costs related to the computer program.

2. The method of claim 1 wherein presenting a message to facilitate user interaction with the displayed interactive advertisement comprises facilitating two-way communication, and further comprises:
receiving a speech input at the user interface of the user device; and
processing the speech input according to the speech-to-text commands.

3. The method of claim 1 further comprising selectively communicating information regarding the user interaction to a remote advertising server.

4. The method of claim 1 wherein presenting a message to facilitate user interaction with the displayed interactive advertisement further comprises accessing a user commands configuration file comprising user created speech commands, wherein the user commands configuration file is hosted by the user device.

5. The method of claim 1 wherein presenting a message to facilitate user interaction with the displayed interactive advertisement comprises referencing predetermined vocabulary and predetermined grammar associated with the displayed advertisement.

6. The method of claim 1 wherein transmitting a signal to access the at least one commands configuration file comprises accessing a launch commands file and a program commands file.

7. The method of claim 6 wherein the launch commands file is read from the distributor computing device and not downloaded to the user device and the program commands file is downloaded locally to the user device, the method further comprising reading the program commands file at the user device.

8. The method of claim 1 further comprising:
the user device saving locally the computer program, and wherein the at least one commands configuration file is hosted at the distributor computing device to permit the commands configuration file to be saved external to the computer program.

9. The method of claim 1 further comprising the user device accessing a plurality of advertisements and associated commands configuration files hosted by different distributor computing devices.

10. An apparatus comprising:
a user computing device having at least one processing device and a user interface, the user device configured to request and receive information from a distributor computing device, the user interface comprising a banner window and a browser window;
the user interface configured to display at least one program display of a computer program configured to request and receive information and an interactive advertisement;
the at least one processing device configured to access at least one commands configuration file that comprises:
speech-to-text commands related to the interactive advertisement,
at least one commands parameter for the speech-to-text commands,
at least one of a URL link to be accessed via the browser window for each speech-to-text command and at least one graphic to be displayed via the banner window for each speech-to-text command, and
identifying information for an advertising sponsor of the interactive advertisement to facilitate collection of revenue to subsidize costs related to the computer program,
wherein the at least one commands configuration file is hosted by the distributor computing device located remotely from the user computing device;
the user device configured to present a message associated with the interactive advertisement via the user interface to facilitate user interaction with the interactive advertisement and update the display in response to the user interaction received, the message received at the user device from the distributor computing device;
the at least one processing device of the user computing device being configured to receive a speech-to-text command, recognize the received speech-to-text command as corresponding to at least one of the speech-to-text commands of the commands configuration file related to the interactive advertisement, and, responsive to the recognized speech-to-text command, update at least one of the banner window with the at least one graphic for the speech-to-text command in the at least one commands configuration file and update the browser window according to the URL link for the speech-to-text command in the at least one commands configuration file.

11. The apparatus of claim 10 wherein the user computing device is configured to facilitate two-way communication and is configured to:
receive a speech input at the user interface of the user computing device; and
process the speech input according to the speech-to-text commands.

12. The apparatus of claim 11 wherein the user computing device is configured to selectively communicate information regarding the user interaction to a remote advertising server.

13. The apparatus of claim 11 further comprising the user computing device configured to access a user commands configuration file with user created speech commands, wherein the user commands configuration file is hosted by the user computing device.

14. The apparatus of claim 10 wherein the user computing device is configured to access a launch commands file and a program commands file, wherein the launch commands file is read from the distributor computing device and not downloaded to the user computing device and the program commands file is saved locally at the user computing device.

15. The apparatus of claim 10 further comprising at least one memory, wherein the computer program is saved locally in the at least one memory.

16. The apparatus of claim 10 wherein:
the user computing device is configured to affect the user interface to display a plurality of interactive advertisements, and
the user computing device is configured to control the computer program to access a plurality of associated commands configuration files hosted by different distributor computing devices.

17. The method of claim 1 wherein the at least one commands configuration file has a default path and a sponsor identification path.

18. The method of claim 2 further comprising generating a spoken message at the user device.

19. The apparatus of claim 11 wherein the user computing device is configured to generate a spoken message.

* * * * *